（12） United States Patent
Zhou et al.

(10) Patent No.: US 12,358,074 B2
(45) Date of Patent: Jul. 15, 2025

(54) LASER WELDING CONTROL FEEDBACK METHOD, APPARATUS AND SYSTEM, AND ELECTRONIC DEVICE

(71) Applicant: Guangdong Lyric Robot Automation Co., Ltd., Huizhou (CN)

(72) Inventors: Junjie Zhou, Huizhou (CN); Lin Wang, Huizhou (CN); Zongbao Chen, Huizhou (CN); Haisheng Cai, Huizhou (CN)

(73) Assignee: Guangdong Lyric Robot Automation Co., Ltd., Huizhou (CN)

( * ) Notice: Subject to any disclaimer, the term of this patent is extended or adjusted under 35 U.S.C. 154(b) by 877 days.

(21) Appl. No.: 17/621,079

(22) PCT Filed: Nov. 30, 2019

(86) PCT No.: PCT/CN2019/122241
§ 371 (c)(1),
(2) Date: Dec. 20, 2021

(87) PCT Pub. No.: WO2020/253130
PCT Pub. Date: Dec. 24, 2020

(65) Prior Publication Data
US 2022/0347795 A1 Nov. 3, 2022

(30) Foreign Application Priority Data
Jun. 20, 2019 (CN) .......................... 201910540474.8

(51) Int. Cl.
*B23K 26/24* (2014.01)
*B23K 26/042* (2014.01)
(Continued)

(52) U.S. Cl.
CPC ............ *B23K 26/24* (2013.01); *B23K 26/042* (2015.10); *B23K 26/0604* (2013.01);
(Continued)

(58) Field of Classification Search
CPC .................. B23K 26/24; B23K 26/042; B23K 26/0604; B23K 26/0876; B23K 37/0258;
(Continued)

(56) References Cited

U.S. PATENT DOCUMENTS

| | | | |
|---|---|---|---|
| 2008/0035619 A1* | 2/2008 | Hamaguchi | ............ B25J 9/1664 219/121.79 |
| 2013/0200053 A1* | 8/2013 | Bordatchev | ............ B23K 26/04 219/121.78 |
| 2019/0126404 A1 | 5/2019 | Matsumoto et al. | |

FOREIGN PATENT DOCUMENTS

| | | |
|---|---|---|
| CN | 101125392 A | 2/2008 |
| CN | 101282816 B | 11/2011 |

(Continued)

OTHER PUBLICATIONS

First Office Action issued Dec. 19, 2019 from Chinese Patent Application No. 201910540474.8, 18 pages.
(Continued)

*Primary Examiner* — John P. Dulka
(74) *Attorney, Agent, or Firm* — Daylight Law, P.C.

(57) ABSTRACT

A laser welding control method, apparatus and system, and an electronic device are disclosed, the method includes: receiving a current position of a welding head fed back by an encoder; determining whether the current position reaches a set position; and in response to the welding head reaching the set position, sending a laser control signal to a laser device to control the laser device to output laser at the set position.

16 Claims, 4 Drawing Sheets

(51) Int. Cl.
*B23K 26/06* (2014.01)
*B23K 26/08* (2014.01)
*B23K 37/02* (2006.01)
*G05B 19/4155* (2006.01)

(52) U.S. Cl.
CPC ...... *B23K 26/0876* (2013.01); *B23K 37/0258* (2013.01); *G05B 19/4155* (2013.01); *G05B 2219/45138* (2013.01)

(58) Field of Classification Search
CPC ...... B23K 26/30; B23K 26/21; B23K 26/702; G05B 19/4155; G05B 2219/45138
See application file for complete search history.

(56) References Cited

FOREIGN PATENT DOCUMENTS

| | | |
|---|---|---|
| CN | 206925430 U | 1/2018 |
| CN | 108971755 A | 12/2018 |
| CN | 109623147 A | 4/2019 |
| CN | 108115292 B | 7/2020 |
| IN | 110125544 A | 8/2019 |
| JP | 2008155285 A | 7/2008 |
| JP | 2019038010 A | 3/2019 |

OTHER PUBLICATIONS

Third Office Action issued Sep. 11, 2020 from Chinese Patent Application No. 201910540474.8, 24 pages.
International Search Report and Written Opinion dated Mar. 25, 2020 from International Application No. PCT/CN2019/122241, 12 pages.
Second Office Action issued Apr. 29, 2020 from Chinese Patent Application No. 201910540474.8, 24 pages.
First Office Action for EP Application No. 19933584.5, mailed Jul. 26, 2022, pp. 1-7.
Supplementary Search Report for EP Application No. 19933584.5, mailed Jul. 15, 2022, p. 1.

* cited by examiner

LASER WELDING CONTROL FEEDBACK METHOD, APPARATUS AND SYSTEM, AND ELECTRONIC DEVICE

CROSS-REFERENCE TO RELATED APPLICATIONS

This application is a national stage filing under 35 U.S.C. § 371 of international application number PCT/CN2019/122241, filed Nov. 30, 2019, which claims priority to Chinese patent application No. 2019105404748 filed Jun. 20, 2019. The contents of these applications are incorporated herein by reference in their entirety.

TECHNICAL FIELD

The present application relates to the technical field of welding, and more particularly, to a laser welding control method, apparatus and system, and an electronic device.

BACKGROUND

Since a target device to be welded may not be a linear device, it is necessary to reduce a speed when welding a bending position to avoid a welding head from deviating from a welding trajectory. However, changes of the speed during welding may lead to welding defects such as accumulation, collapse and hole explosion at a position where the speed is changed.

SUMMARY

In view of this, embodiments of the present application aim to provide a laser welding control method, apparatus and system, and an electronic device. An effect of better uniformity of laser welding can be achieved.

In a first aspect, an embodiment of the present application provides a laser welding control method, including:
  receiving a current position of a welding head fed back by an encoder;
  determining whether the current position reaches a set position; and
  in response to the welding head reaching the set position, sending a laser control signal to a laser device to control the laser device to output laser at the set position.

Compared with the laser device continuously outputting laser in the prior art, with the laser welding control method provided by the embodiment of the present application, welding points of a welded target object can be more uniform by acquiring the position of the welding head and controlling the laser device to output laser only when the welding head is at the set position.

In combination with the first aspect, the embodiment of the present application provides a first possible implementation of the first aspect, wherein: the determining whether the current position reaches a set position includes:
  determining whether a distance between the current position and a position at which laser is outputted for the last time is a set length, and in response to the distance between the current position and the position at which the laser is outputted for the last time being the set length, determining that the welding head reaches the set position.

Further, with the laser welding control method provided by the embodiment of the present application, equidistant welding can be implemented by allowing the distance between the current position of the welding head and the position of the welding head outputting the laser for the last time to reach the set length and then controlling output of the laser, so that a target device is welded more uniformly.

In combination with the first possible implementation of the first aspect, the embodiment of the present application provides a second possible implementation of the first aspect, wherein: the set length is a length ranging from 0.1 μm to 100 mm.

In combination with the first aspect, the embodiment of the present application provides a third possible implementation of the first aspect, wherein: the laser welding control method further includes:
  sending a trajectory control signal to the encoder so that the encoder controls the welding head to move along a preset welding trajectory map according to the trajectory control signal.

Further, with the laser welding control method provided by the embodiment of the present application, the target device can also be welded according to the preset welding trajectory map, so that the welded target device can be more regular.

In combination with the third possible implementation of the first aspect, the embodiment of the present application provides a fourth possible implementation of the first aspect, wherein: the determining whether the current position reaches a set position includes:
  comparing the current position with the preset welding trajectory map;
  identifying whether the current position is a marked position on the preset welding trajectory map, and
  in response to the current position being the marked position on the preset welding trajectory map, determining that the welding head reaches the set position.

Further, with the laser welding control method provided by the embodiment of the present application, the target device can also be welded according to the preset welding trajectory map, so that the welded target device can be more regular. In addition, the laser device is controlled to output only when the marked position on the present welding trajectory map is reached, so that a welding line of the welded target device can be more uniform and smooth.

In combination with the first aspect or any one of the first possible implementation to a fifth possible implementation of the first aspect, the embodiment of the present application provides the fourth possible implementation of the first aspect, wherein: the laser welding control method further includes:
  sending a first trajectory control signal to the encoder according to a first rule control so that the encoder controls the welding head to move linearly at a first speed according to the first trajectory control signal; and
  sending a second trajectory control signal to the encoder according to a second rule control so that the encoder controls the welding head to move in a curve at a second speed according to the second trajectory control signal, wherein the first speed is greater than the second speed.

Further, with the laser welding control method provided by the embodiment of the present application, the welding head can move linearly at the first speed and move in a curve at the second speed, and shaking of a laser welding machine tool can be reduced by allowing the speed of moving in a curve to be less than the speed of moving linearly, so that welding quality problems caused by the shaking of the laser welding machine tool are reduced.

In combination with the fourth possible implementation of the first aspect, the embodiment of the present application provides a sixth possible implementation of the first aspect, wherein: a difference between the first speed and the second speed is greater than 3% of the first speed.

Further, with the laser welding control method provided by the embodiment of the present application, the shaking of the laser welding machine tool can be reduced by allowing the difference between the first speed and the second speed to be greater than 3% of the first speed.

In combination with the first aspect, the embodiment of the present application provides a seventh possible implementation of the first aspect, wherein: the laser device includes a first laser device and a second laser device, and the sending a laser control signal to a laser device to control the laser device to output laser at the set position includes:

sending a first control signal to the first laser device to control the first laser device to output laser; and sending a second control signal to the second laser device to control the second laser device to output laser.

Further, with the laser welding control method provided by the embodiment of the present application, the first laser device can be controlled to preheat and the second laser device can be controlled to weld respectively by two control channels, so that a welding speed is faster and a welding effect is better.

In a second aspect, an embodiment of the present application provides a laser welding control apparatus, including:

a receiving module configured for receiving a current position of a welding head fed back by an encoder;

a determining module configured for determining whether the current position reaches a set position; and a control module configured for, in response to the welding head reaching the set position, sending a laser control signal to a laser device to control the laser device to output laser at the set position.

In a third aspect, an embodiment of the present application provides a laser welding control system, including:

a controller;

an encoder connected with the controller;

a drive motor connected with the encoder;

a laser device connected with the drive motor and the controller, wherein the drive motor is configured for driving the welding head to move; and the controller is configured for receiving a current position of the welding head fed back by the encoder, determining whether the current position reaches a set position, and in response to the welding head reaching the set position, sending a laser control signal to the laser device to control the laser device to output laser at the set position.

In combination with the third aspect, the embodiment of the present application provides a first possible implementation of the third aspect, wherein: the controller includes a main controller and an output controller;

the main controller is configured for controlling a motion trajectory of the welding head; and the output controller is configured for controlling the laser device to output laser.

In a fourth aspect, an embodiment of the present application also provides an electronic device, including a processor and a memory, wherein the memory stores a machine-readable instruction executable by the processor, and when the electronic device is operated, the machine-readable instruction is executed by the processor to perform the method provided in the first aspect or any one of possible implementations of the first aspect above.

In a fifth aspect, an embodiment of the present application also provides a computer-readable storage medium, and the computer-readable storage medium stores a computer program that, when executed by a processor, performs the method provided in the first aspect or any one of possible implementations of the first aspect above.

Through the above features of the present application, it can be implemented that: the laser device outputs laser only when the welding head is at the set position, so that the welding effect of the welding line will not be affected by the moving speed of the welding head. In addition, the welding line can be more uniform and smooth by outputting laser only when a distance between adjacent welding points is a set length, or the marked position on the present welding trajectory map is reached.

To make the above objects, features and advantages of the present application more obvious and easier to understand, the following embodiments are given in detail with reference to the drawings attached.

BRIEF DESCRIPTION OF THE DRAWINGS

In order to more clearly illustrate the technical solutions of the embodiments of the present application, the drawings that are required to describe the embodiments will be briefly introduced below. It should be understood that the drawings below only illustrate some embodiments of the present application, and should not be regarded as limiting the scope. Those having ordinary skills in the art can obtain other related drawings according to these drawings without creative work.

Reference numerals: 10 refers to laser welding control system; 110 refers to main controller; 120 refers to output controller; 130 refers to encoder; 140 refers to drive motor; 150 refers to welding head; and 160 refers to laser device.

DETAILED DESCRIPTION

The technical solutions of the embodiments of the present application will be described hereinafter with reference to the drawings in the embodiments of the present application.

It should be noted that similar reference numerals and letters indicate similar items in the following drawings, so once one item is defined in one drawing, it does not need to be further defined and explained in the following drawings. Meanwhile, in the description of the present application, the terms "first" and "second" are used to distinguish between different elements only and cannot be understood as indicating or implying relative importance.

Due to various shapes of a target device to be welded, curve welding may occur during welding. Continuous high-speed cornering may cause shaking of a laser welding machine tool, so that it is necessary to reduce a moving speed during cornering. On this issue, a problem that a cornering speed cannot be reduced by more than 3% may be solved by increasing a weight of the laser welding machine tool and using a coreless linear motor, a welding speed can be increased to 200 mm/s, and a weight of marble has exceeded 6 tons to 7 tons.

A relationship among an acceleration, a speed, a cornering radius and a mass of the laser welding machine tool is represented by parameters as follows: $A=V^2/(RM)$, and it can be seen that, when a welding head mass M is constant and a corner R is small (for example, the R is generally 2 mm to 2.5 mm), the acceleration A is proportional to a square of the welding speed V. Therefore, when a welding speed needs to be further increased in an existing system, an acceleration of a motion platform will be multiplied. For example, the current speed is 200 mm/s, and the acceleration has reached 2 G. If the speed is increased to above 250 mm/s, the acceleration will reach 3 G or above. Therefore, the higher the acceleration is, the heavier the laser welding machine tool is, so that high-speed cornering is ensured, without trajectory deviation and shaking.

However, according to researches of the inventor, although the shaking of the laser welding machine tool can be reduced by increasing the weight of the laser welding machine tool, due to a change of the speed and output of laser at a fixed frequency, there may still be a problem of nonuniform distribution of the laser, which leads to welding defects such as accumulation, collapse and hole explosion at a welding corner.

Further, in order to reduce nonuniform welding lines caused by the change of the speed, an energy following mode may be used, which means that energy output of a laser device is proportional to the moving speed of the welding head. The faster the moving speed of the welding head is, the higher the output energy of the laser device is, and on the contrary, the slower the moving speed of the welding head is, the lower the output energy of the laser device is. However, in actual welding, there may be a deviation between a moving trajectory and an actually planned trajectory of the welding head, and there is also a deviation between an actual moving speed and a planned moving speed of the welding head, leading to a deviation between actual energy output and expected energy output of the laser device. Especially when the welding head moves at a high speed, the deviation of laser output of the laser device can be increased, leading to poor or unstable welding. Therefore, under normal circumstances, an allowable speed fluctuation range during whole welding process is very small, and a change value of the speed in the industry is generally within 3%. However, in a curve stage, if the speed is excessively fast, the shaking of the laser welding machine tool may be caused.

In view of the above researches, the inventor provides a laser welding control method, apparatus and system and an electronic device. By controlling the laser device to output laser only when the welding head is at a set position, energy output of the laser device can be provided independent of the speed. Thus, energy output by the laser device onto a target device is uniform regardless of high-speed movement or low-speed movement.

In order to facilitate understanding of the embodiment, an operating environment for executing a laser welding control method disclosed in the embodiment of the present application is introduced first.

Embodiment 1

Figure 1:
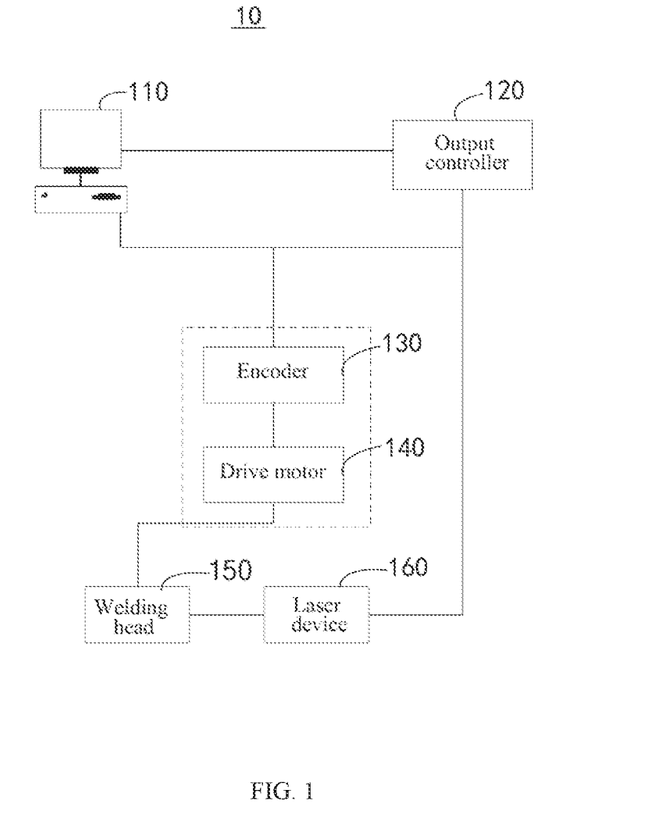
FIG. 1 is a schematic diagram of interaction of a laser welding control system provided by an embodiment of the present application.

FIG. 1 is a schematic diagram of interaction of a laser welding control system 10 provided by the embodiment of the present application. The laser welding control system 10 includes a controller, an encoder 130, a drive motor 140, a welding head 150 and a laser device 160.

The controller above may include a main controller 110 and an output controller 120.

The main controller 110 is connected with the laser device 160 and the encoder 130, and configured for outputting a welding trajectory of a to-be-welded target device to the encoder 130.

The main controller 110 above may be a network server or a database server; and may also be a personal computer (PC), a tablet computer, a smart phone, a personal digital assistant (PDA), and the like.

The output controller 120 may be a control circuit, and the output controller 120 may also be a control chip. Output and shutdown of the laser device 160 may be controlled by controlling on and off of a switch of the laser device 160. Optionally, the output controller 120 outputs high and low levels to control the on and off of the switch of the laser device 160.

Optionally, the main controller 110 may be configured for receiving a current position of the welding head 150 fed back by the encoder 130, determining whether the current position reaches a set position, and if the welding head 150 reaches the set position, sending a laser control instruction to the laser device 160 to control the laser device 160 to output laser at the set position.

Optionally, the main controller 110 above may be provided with an operating button for starting welding, stopping welding and other operations.

Optionally, the output controller 120 may be configured for receiving a welding trajectory map sent by the main controller 110 and a corresponding laser output position. The output controller 120 may also be configured for receiving a current position of the welding head 150 fed back by the encoder 130, determining whether the current position reaches a set position for laser output marked on the welding trajectory map, and if the welding head 150 reaches the set position, sending a laser control signal to the laser device 160 to control the laser device 160 to output laser at the set position.

The output controller 120 is configured for controlling the laser device 160 to output laser. Optionally, the output controller 120 controls the laser device 160 to output laser only when the current position of the welding head 150 fed back by the encoder 130 is received and the current position is the set position.

The encoder 130 controls the drive motor 140 to move. Singals are transmitted between the encoder 130 and the drive motor 140 bidirectionally. The encoder 130 sends a signal to control the drive motor 140 to move, and the encoder 130 may also collect a real-time position signal from the drive motor 140.

Illustratively, the encoder 130 may acquire a current position of the drive motor 140, while the drive motor 140 is driving the welding head 150 to move, so that the current position of the drive motor 140 may represent the current position of the welding head 150.

Optionally, the encoder 130 and the drive motor 140 above may be an integrated structure, for example, the encoder 130 may be a component carried by the drive motor 140. Optionally, the encoder 130 and the drive motor 140 above may also be two independent devices.

In an example, the laser device 160 above may include a 3,000 W fiber laser device and a 2,500 W semiconductor laser device. The drive motor 140 above may be a linear motor. In an example, laser energy of the two laser devices may be set, for example, energy of the fiber laser device is 1,500 W to 1,800 W, and energy of the semiconductor laser device is 1,500 W to 2,000 W. An output frequency of the semiconductor laser device is 1 KHz to 2 KHz, with an acceleration of 1 G to 1.5 G (G refers to an acceleration of gravity), and nitrogen serves as a protective gas, with a flow rate capable of being 10 L/min to 25 L/min, so that a welding speed of 200 mm/s may be reached.

In another example, the laser device 160 above may include a 4,000 W fiber laser device and a 2,500 W semiconductor laser device. The drive motor above may be a linear motor. In an example, laser energy of the two laser devices may be set, for example, energy of the fiber laser device is 1,800 W to 2,500 W, and energy of the semiconductor laser device is 1,500 W to 2,000 W. An output frequency of the semiconductor laser device is 2 KHz to 5 KHz, with an acceleration of 1.5 G to 2 G, and nitrogen serves as a protective gas, with a flow rate capable of being 10 L/min to 25 L/min, so that a welding speed of 200 mm/s to 250 mm/s may be reached.

The laser welding control system 10 in the embodiment may be configured for executing the steps in the methods provided by the embodiments of the present application. An implementation process of the laser welding control method is described in detail hereinafter through multiple embodiments.

Embodiment 2

Figure 2:
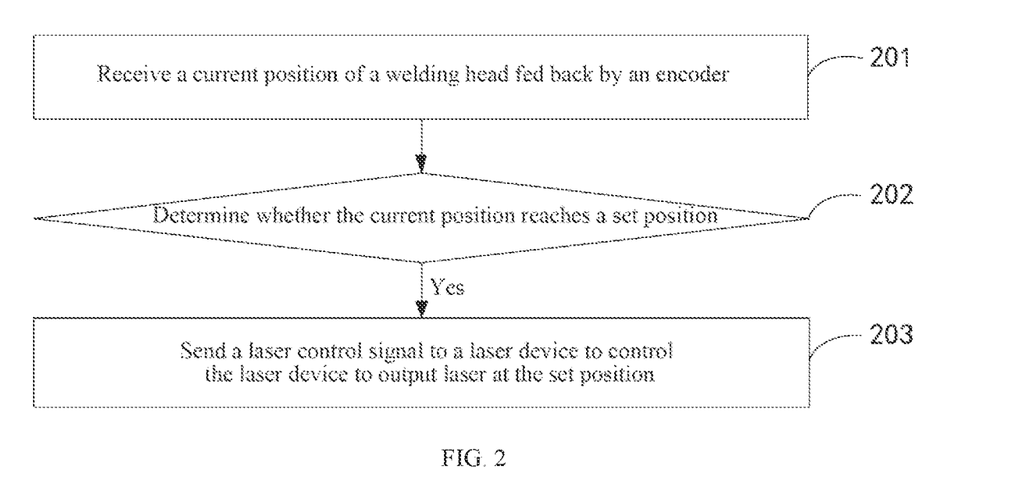
FIG. 2 is a flow chart of a laser welding control method provided by an embodiment of the present application.

FIG. 2 is a flow chart of a laser welding control method provided by the embodiment of the present application. A specific flow shown in FIG. 2 will be described in detail hereinafter.

In step 201, a current position of a welding head fed back by an encoder is received.

Optionally, a target device may be welded according to a preset welding trajectory map.

Since different types of devices may have different positions to be welded, requirements of welding density may also be different. Optionally, each type of device may correspond to one welding trajectory map. Optionally, an application program may be run on a main controller. A motion route of welding of each type of device may be planned according to a welding trajectory map of this type of device through the application program.

Optionally, the welding trajectory map above may be a trajectory map directly imported into the application program above.

Optionally, a model graph of each type of device may also be imported into the application program above, and positions on the model to be welded are determined by identifying on the model, so as to determine the welding trajectory map. In an example, device data such as parameters of each to-be-welded device and parameters of welding positions may be inputted, and the welding trajectory map is determined through the device data and the model graph of the device.

Optionally, before the step 201, the method further includes a step of: sending a trajectory control signal to the encoder so that the encoder controls the welding head to move along a preset welding trajectory map according to the trajectory control signal.

Illustratively, the encoder controls the drive motor to move, and the drive motor drives the welding head to move according to the preset welding trajectory map.

In step 202, whether the current position reaches a set position is determined.

In an implementation, the step 202 may include: determining whether a distance between the current position and a position at which laser is outputted for the last time is a set length, and if the distance between the current position and the position at which the laser is outputted for the last time is the set length, determining that the welding head reaches the set position.

Optionally, the set length above may be a length set before welding, or a length set by default.

Illustratively, the set length is a length ranging from 0.1 μm to 100 mm. Specifically, different set lengths may be selected according to different target devices to be welded. For example, a set length of welding around a power battery may be 2 mm, 2.5 mm, and the like.

Figure 3A:
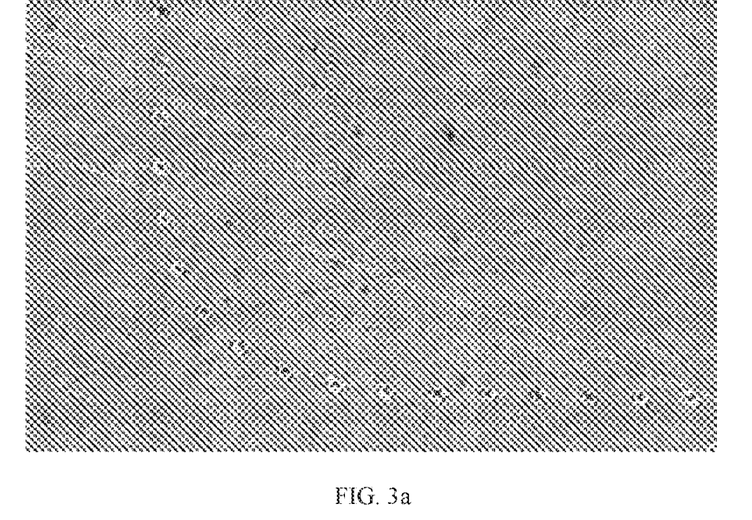
FIG. 3*a* is a schematic structural diagram of welding points at a position in an example provided by the embodiment of the present application.
Figure 3B:
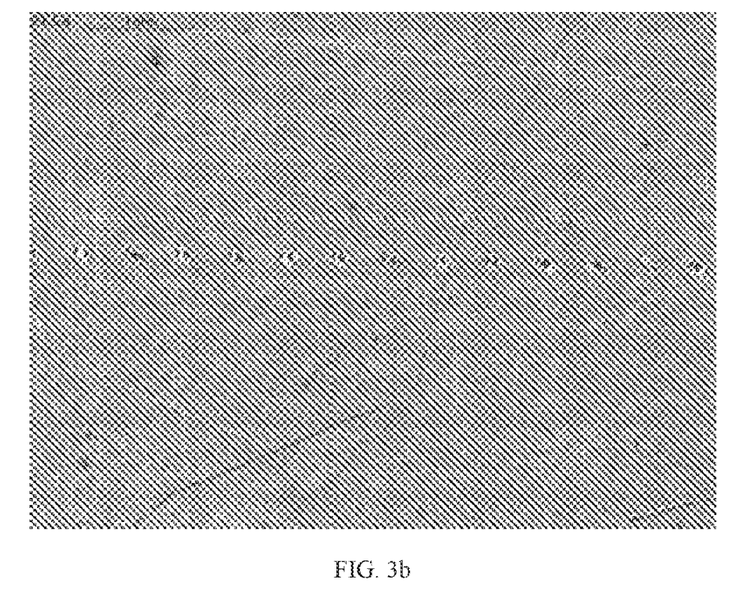
FIG. 3*b* is a schematic structural diagram of welding points at another position in an example provided by the embodiment of the present application.
Figure 3C:
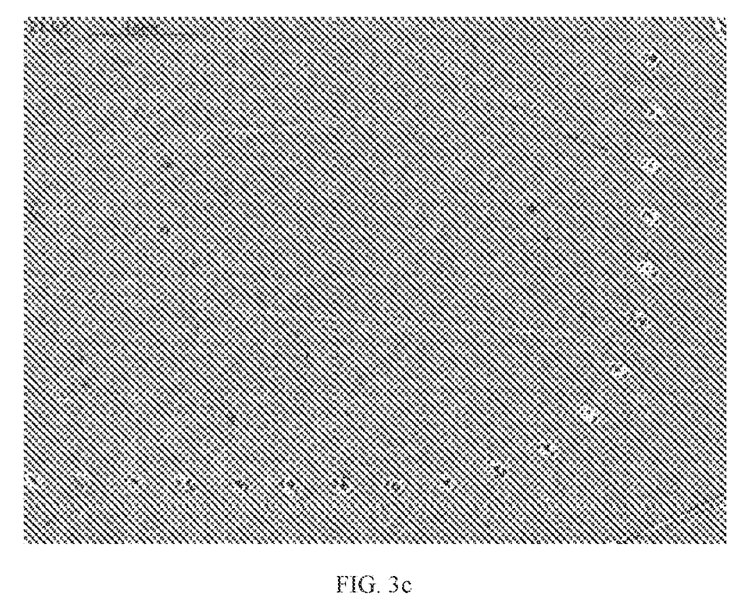
FIG. 3*c* is a schematic structural diagram of welding points at yet another position in an example provided by the embodiment of the present application.

As shown in FIG. 3a, FIG. 3b and FIG. 3c, which are schematic structural diagrams of welding points in an example. A difference between any two welding distances at a first corner shown in FIG. 3a is less than a set value, a difference between any two welding distances at a linear segment shown in FIG. 3b is less than the set value, and a difference between any two welding distances at a second corner shown in FIG. 3c is less than the set value. For the first corner and the second corner, the welding distance refers to a length of an arc between any two adjacent welding points, and for the linear segment, the welding distance refers to a linear distance between any two adjacent welding points. The set value above may be a small error value. Illustratively, a difference between curve distances of the welding points may be zero.

With the laser welding control method provided by the embodiment of the present application, equidistant welding can be implemented by allowing the distance between the current position of the welding head and the position at which laser is outputted for the last time to reach the set length and then controlling output of the laser, so that the target device is welded more uniformly. Through the equidistant welding above, the effect of laser welding is only relevant to the position of the welding head, but irrelevant to the moving speed of the welding head, so that laser can also be outputted uniformly at different moving speeds, thus implementing uniform welding.

In another implementation, the step 202 may include: comparing the current position with the preset welding trajectory map, identifying whether the current position is a marked position on the preset welding trajectory map, and if the current position is the marked position on the preset welding trajectory map, determining that the welding head reaches the set position.

The marked position above may be a marked position formed in response to a marking operation of a user on the preset welding trajectory map when the welding trajectory map is produced. Optionally, the marked position above may also be a marked position obtained by automatically marking on the preset welding trajectory map according to a set length.

Further, with the laser welding control method provided by the embodiment of the present application, the target device can also be welded according to the preset welding trajectory map, so that the welded target device can be more regular. In addition, the laser device is controlled to output only when the marked position on the present welding trajectory map is reached, so that a welding line of the welded target device can be more uniform and smooth.

When the welding head reaches the set position, step 203 is executed. When the welding head reaches the set position, the encoder continues to control the drive motor to move, and the drive motor drives the welding head to move.

In step 203, a laser control signal is sent to a laser device to control the laser device to output laser at the set position.

Optionally, a high level or a low level may be output to control a switch for the laser device, so as to control output or shutdown of energy of the laser device.

In order to improve a welding efficiency, the laser device above may include a first laser device and a second laser device. The first laser device is configured for outputting laser to preheat a to-be-welded target device, and the second laser device is configured for outputting laser to weld the to-be-welded target device.

Illustratively, the step 203 may include: sending a first control signal to the first laser device to control the first laser device to output laser; and sending a second control signal to the second laser device to control the second laser device to output laser.

Figure 4A:
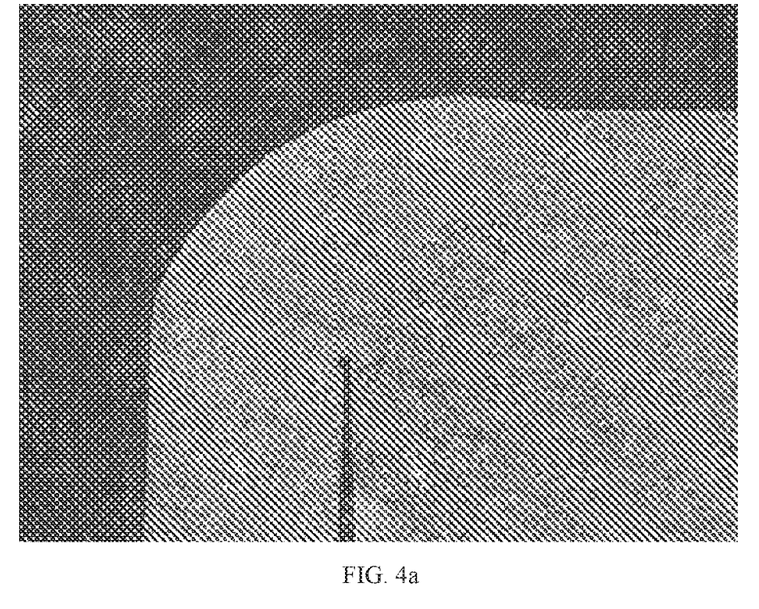
FIG. 4*a* is a schematic microstructural diagram of a welding line formed by linear welding of a target device using the method of the embodiment in an example.
Figure 4B:
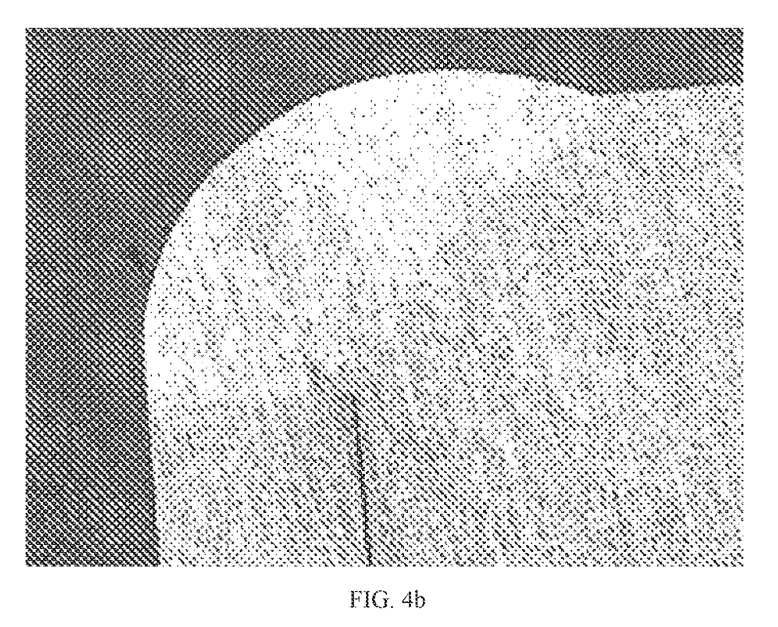
FIG. 4*b* is a schematic microstructural diagram of a welding line formed by cornering welding of the target device using the method of the embodiment in an example.

In an example, as shown in FIG. 4a and FIG. 4b, FIG. 4a is a schematic microstructural diagram of a welding line formed by linear welding of a target device using the method of the embodiment, and FIG. 4b is a schematic microstructural diagram of a welding line formed by cornering welding of the target device using the method of the embodiment. Welding results are as follows: a welding depth and a welding width of the linear part are 0.85 mm and 1.36 mm respectively, and a welding depth and a welding width of the corner part are 0.93 mm and 1.45 mm respectively, which meet technical requirements of welding around the power battery.

In order to reduce shaking of the laser welding system at a corner, the welding head may have a speed when moving in a curve smaller than a speed when moving linearly.

On this basis, optionally, control signals may be sent once, or a control signal may be sent for linear movement and a further control signal may be sent for movement in a curve, so that the welding head is controlled to move at a first speed when moving linearly and move at a second speed when moving in a curve respectively.

Optionally, the laser welding control method may further include the steps of: sending a first trajectory control signal to the encoder according to a first rule control, so that the encoder can control the welding head to move linearly at a first speed according to the first trajectory control signal; and sending a second trajectory control signal to the encoder according to a second rule control, so that the encoder can control the welding head to move in a curve at a second speed according to the second trajectory control signal.

The welding head may be controlled to move at the first speed in a linear segment through the first rule control above; and the welding head may be controlled to move at the second speed in a curve segment through the second rule control above.

In an embodiment, the first speed is greater than the second speed.

Optionally, a difference between the first speed and the second speed is greater than 3% of the first speed.

With the laser welding control method provided by the embodiment of the present application, the welding head can move linearly at the first speed and move in a curve at the second speed, and shaking of a laser welding machine tool can be reduced by allowing the speed when moving in a curve to be less than the speed when moving linearly, so that welding quality problems caused by the shaking of the laser welding machine tool are reduced. The shaking of the laser welding machine tool can be further reduced by allowing the difference between the first speed and the second speed to be greater than 3% of the first speed.

Compared with the laser device continuously outputting laser in the prior art, with the laser welding control method provided by the embodiment of the present application, welding points of a welded target object can be more uniform by acquiring the position of the welding head and controlling the laser device to output laser only when the welding head is at the set position. In addition, in existing welding around the power battery, a corner R of a welding trajectory ranges from 2 mm to 2.5 mm, and in an existing laser output mode, a change rate of a cornering speed needs to be lower than 3%, which is equivalent to high-speed cornering, has a very high requirement for a laser welding device, and is prone to shaking. In addition, due to a small spot in laser welding, a precision requirement for a trajectory is very high. In order to ensure a welding effect and a yield, deviation of the whole trajectory (deviation of an actual motion output trajectory of the welding head from the preset trajectory map) generally needs to be controlled within 0.03 mm. However, according to the method provided by the embodiment of the present application, since laser output of the laser device is independent of the moving speed of the welding head by making the laser device output laser at an equidistance, the speed can be reduced at a curve, which can not only reduces output of laser energy, but also reduce deviation of energy output. In the prior art, an energy following mode (i.e., the energy output is proportional to the speed) is provided, in which the faster the moving speed of the welding head is, the higher the output energy of the laser device is, resulting in a problem deviation of energy received by a welded object due to the fact that there is a certain deviation between a planned speed and an actual moving speed at different positions during high-speed welding. However, the method provided by the embodiment of the present application can effectively alleviate the above problem in the prior art. Further, since the moving speed of the welding head can be reduced at the curve, the shaking of the laser welding machine tool can be reduced, and the dependence of high-speed welding on the laser welding machine tool can be reduced, and at the same speed, a weight of the laser welding machine tool can be reduced, and a manufacturing cost can be reduced.

Embodiment 3

Based on the same inventive concept, the embodiment of the present application also provides a laser welding control apparatus corresponding to the laser welding control method. Since the principle of solving problems by the apparatus according to the embodiment of the present application is similar to that of the laser welding control method according to the embodiment of the present application above, implementation of the apparatus may refer to implementation of the method, and repeated contents will not be set forth.

Figure 5:
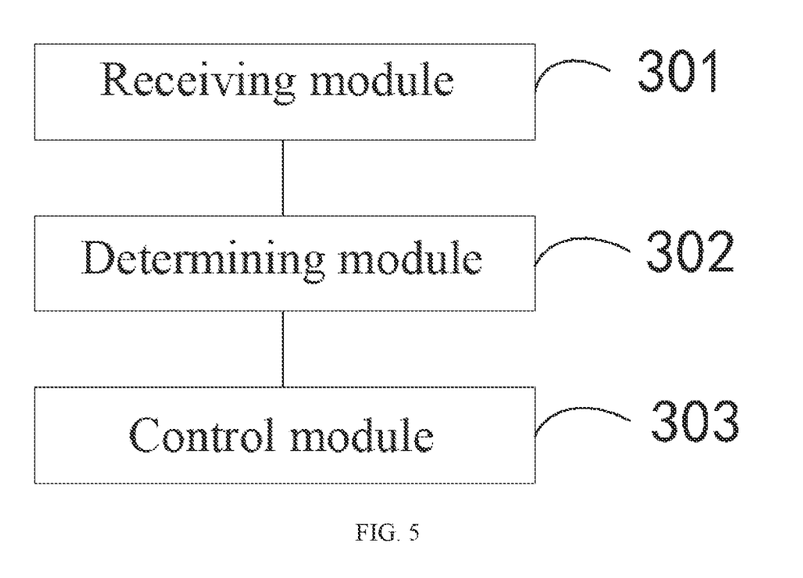
FIG. 5 is a schematic diagram of functional modules of a laser welding control apparatus provided by an embodiment of the present application.

FIG. 5 is a schematic diagram of functional modules of the laser welding control apparatus provided by the embodiment of the present application. Modules in the laser welding control apparatus in the embodiment are configured for executing the steps in the method embodiments above. The laser welding control apparatus includes a receiving module 301, a determining module 302 and a control module 303.

The receiving module 301 is configured for receiving a current position of a welding head fed back by an encoder.

The determining module 302 is configured for determining whether the current position reaches a set position.

The control module 303 is configured for, in response to the welding head reaching the set position, sending a laser control signal to a laser device to control the laser device to output laser at the set position.

In a possible implementation, the determining module 302 is configured for:
  determining whether a distance between the current position and a position at which laser is outputted for the last time is a set length, and if the distance between the current position and the position at which the laser is outputted for the last time is the set length, determining that the welding head reaches the set position.

In a possible implementation, the laser welding control apparatus further includes a first sending module configured for:
  sending a trajectory control signal to the encoder so that the encoder controls the welding head to move along a preset welding trajectory map according to the trajectory control signal.

In a possible implementation, the determining module 302 is further configured for:
  comparing the current position with the preset welding trajectory map; and
  identifying whether the current position is a marked position on the preset welding trajectory map, and if the current position is the marked position on the preset welding trajectory map, determining that the welding head reaches the set position.

In a possible implementation, the control module 303 may include a first control unit and a second control unit.

The first control unit is configured for sending a first control signal to a first laser device to control the first laser device to output laser.

The second control unit is configured for sending a second control signal to a second laser device to control the second laser device to output laser.

In a possible implementation, the laser welding control apparatus further includes a second sending module configured for:
  sending a first trajectory control signal to the encoder according to a first rule control so that the encoder can control the welding head to move linearly at a first speed according to the first trajectory control signal; and
  sending a second trajectory control signal to the encoder according to a second rule control so that the encoder can control the welding head to move in a curve at a second speed according to the second trajectory control signal, wherein the first speed is greater than the second speed.

In a possible implementation, a difference between the first speed and the second speed is greater than 3% of the first speed.

Moreover, an embodiment of the present application also provides a computer-readable storage medium, and the computer-readable storage medium stores a computer program that, when executed by a processor, performs the steps of the laser welding control method in the method embodiments above.

The computer program product of the laser welding control method provided by the embodiments of the present application includes the computer-readable storage medium in which a program code is stored, and an instruction included in the program code may be configured for executing the steps of the laser welding control method described in the above method embodiments. Please refer to the above method embodiments for details, which will not be elaborated herein.

In the multiple embodiments provided in the present application, it should be understood that the disclosed apparatus and method may also be implemented in other manners. The apparatus embodiment described above is only exemplary, for example, the flow charts and block diagrams in the drawings show the possibly implemented architectures, functions, and operations for the apparatus, the method and the computer program product according to multiple embodiments of the present application. In this regard, each block in the flow chart or block diagram may represent one module, one program segment, or a part of code. The module, the program segment, or the part of code contains one or more executable instructions for implementing specified logical functions. It should also be noted that in some alternative implementations, the functions in the blocks may also occur in a different order from those shown in the drawings. For example, two consecutive blocks may actually be executed in substantially parallel, and in some cases may be executed in a reverse order, depending on the functions involved. It should also be noted that each block in the block diagrams and/or flowcharts, and combinations of the blocks in the block diagrams and/or flowcharts, may be implemented with dedicated hardware-based systems that perform specified functions or actions, or may be implemented with combinations of dedicated hardware and computer instructions.

In addition, each functional module in each embodiment of the present application may be integrated together to form an independent part, or each module may exist alone physically, or two or more modules may be integrated to form an independent part.

The functions may also be stored in a computer-readable storage medium if being implemented in the form of a software function module and sold or used as an independent product. Based on such understanding, the essence of the technical solutions of the present application, or the part contributing to the prior art or a part of the technical solutions, may be embodied in the form of a software product. The computer software product is stored in a storage medium including a number of instructions such that a computer device (which may be a personal computer, a server, or a network device, etc.) executes all or a part of steps of the method described in each of the embodiments of the present application. The foregoing storage medium includes: any medium that is capable of storing program codes such as a USB disk, a mobile hard disk, a Read-Only Memory (ROM), a Random Access Memory (RAM), a magnetic disk or an optical disk, and the like. It should be noted that relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, a method, an article, or a device including a series of elements, includes not only those elements but also includes other elements not expressly listed, or also includes elements inherent to such process, method, article, or device. In the absence of further limitation, an element defined by the phrase "including a . . . " does not exclude the presence of the same element in the process, method, article, or device.

The above descriptions are merely preferred embodiments of the present application and are not intended to limit this application. For those skilled in the art, this application may have various modifications and changes. Any modification, equivalent replacement, or improvement made without departing from the gist and principle of the present application shall fall within the protection scope of the present application. It should be noted that similar reference numerals and letters indicate similar items in the following drawings, so once one item is defined in one drawing, it does not need to be further defined and explained in the following drawings.

The foregoing descriptions are merely detailed embodiments of the present application, but the protection scope of the present application is not limited thereto. Any person skilled in the art can easily think of changes or substitutions within the technical scope of the present application, and all the changes or substitutions should be covered by the protection scope of the present application. Therefore, the protection scope of the present application should be subjected to the protection scope of the claims.

The invention claimed is:

1. A laser welding control method, comprising:
   receiving a current position of a welding head fed back by an encoder;
   determining whether the current position reaches a set position;
   in response to the welding head reaching the set position, sending a laser control signal to a laser device to control the laser device to output laser at the set position;
   sending a first trajectory control signal to the encoder according to a first rule control so that the encoder controls the welding head to move linearly at a first speed according to the first trajectory control signal; and
   sending a second trajectory control signal to the encoder according to a second rule control so that the encoder controls the welding head to move in a curve at a second speed according to the second trajectory control signal, wherein the first speed is greater than the second speed.

2. The method of claim 1, wherein the determining whether the current position reaches the set position comprises:
   determining whether a distance between the current position and a position at which laser is outputted for a last time is a set length, and
   in response to the distance between the current position and the position at which the laser is outputted for the last time being the set length, determining that the welding head reaches the set position.

3. The method of claim 2, wherein the set length is a length ranging from 0.1 μm to 100 mm.

4. The method of claim 1, further comprising:
   sending a trajectory control signal to the encoder so that the encoder controls the welding head to move along a preset welding trajectory map according to the trajectory control signal.

5. The method of claim 4, wherein the determining whether the current position reaches the set position comprises:
   comparing the current position with the preset welding trajectory map;
   identifying whether the current position is a marked position on the preset welding trajectory map, and
   in response to the current position being the marked position on the preset welding trajectory map, determining that the welding head reaches the set position.

6. The method of claim 1, wherein a difference between the first speed and the second speed is greater than 3% of the first speed.

7. The method of claim 1, wherein the laser device comprises a first laser device and a second laser device, and the sending the laser control signal to the laser device to control the laser device to output laser at the set position comprises:
   sending a first control signal to the first laser device to control the first laser device to output laser; and
   sending a second control signal to the second laser device to control the second laser device to output laser.

8. A laser welding control system, comprising:
   a controller;
   an encoder connected with the controller;
   a drive motor connected with the encoder;
   a welding head connected with the drive motor, wherein the drive motor is configured for driving the welding head to move; and
   a laser device connected with the welding head and the controller, wherein the laser device is configured for outputting laser;
   wherein the controller is configured for; receiving a current position of the welding head fed back by the encoder; determining whether the current position reaches a set position; in response to the welding head reaching the set position, sending a laser control signal to the laser device to control the laser device to output laser at the set position; sending a first trajectory control signal to the encoder according to a first rule control so that the encoder controls the welding head to move linearly at a first speed according to the first trajectory control signal; and sending a second trajectory control signal to the encoder according to a second rule control so that the encoder controls the welding head to move in a curve at a second speed according to the second trajectory control signal, wherein the first speed is greater than the second speed.

9. The laser welding control system of claim 8, wherein the controller comprises a main controller and an output controller;
   the main controller is configured for controlling a motion trajectory of the welding head; and
   the output controller is configured for controlling the laser device to output laser.

10. An electronic device, comprising a processor and a memory, wherein the memory stores a machine-readable instruction executable by the processor, and when the electronic device is operated, the machine-readable instruction is executed by the processor to perform a laser welding control method, comprising:

receiving a current position of a welding head fed back by an encoder;

determining whether the current position reaches a set position;

in response to the welding head reaching the set position, sending a laser control signal to a laser device to control the laser device to output laser at the set position;

sending a first trajectory control signal to the encoder according to a first rule control so that the encoder controls the welding head to move linearly at a first speed according to the first trajectory control signal; and sending a second trajectory control signal to the encoder according to a second rule control so that the encoder controls the welding head to move in a curve at a second speed according to the second trajectory control signal, wherein the first speed is greater than the second speed.

11. The electronic device of claim 10, wherein the determining whether the current position reaches the set position comprises:

determining whether a distance between the current position and a position at which laser is outputted for a last time is a set length, and in response to the distance between the current position and the position at which the laser is outputted for the last time being the set length, determining that the welding head reaches the set position.

12. The electronic device of claim 11, wherein the set length is a length ranging from 0.1 μm to 100 mm.

13. The electronic device of claim 10, wherein the method further comprises:

sending a trajectory control signal to the encoder so that the encoder controls the welding head to move along a preset welding trajectory map according to the trajectory control signal.

14. The electronic device of claim 13, wherein the determining whether the current position reaches the set position comprises:

comparing the current position with the preset welding trajectory map;

identifying whether the current position is a marked position on the preset welding trajectory map, and in response to the current position being the marked position on the preset welding trajectory map, determining that the welding head reaches the set position.

15. The electronic device of claim 10, wherein a difference between the first speed and the second speed is greater than 3% of the first speed.

16. The electronic device of claim 10, wherein the laser device comprises a first laser device and a second laser device, and the sending the laser control signal to the laser device to control the laser device to output laser at the set position comprises:

sending a first control signal to the first laser device to control the first laser device to output laser; and sending a second control signal to the second laser device to control the second laser device to output laser.

* * * * *